United States Patent
Vogel et al.

(10) Patent No.: US 9,214,097 B2
(45) Date of Patent: Dec. 15, 2015

(54) METHOD FOR CREATING A DIRECTORY OF ROAD SECTIONS, METHOD FOR ASCERTAINING ALL ROAD SECTIONS WITHIN A SEARCH AREA, AND COMPUTER PROGRAM

(75) Inventors: Andreas Vogel, Hildesheim (DE); Guido Mueller, Quedlinburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1648 days.

(21) Appl. No.: 12/305,542

(22) PCT Filed: Feb. 8, 2008

(86) PCT No.: PCT/EP2008/051532
§ 371 (c)(1),
(2), (4) Date: May 19, 2009

(87) PCT Pub. No.: WO2008/119585
PCT Pub. Date: Oct. 9, 2008

(65) Prior Publication Data
US 2009/0234877 A1  Sep. 17, 2009

(30) Foreign Application Priority Data
Apr. 3, 2007  (DE) .......... 10 2007 016 002

(51) Int. Cl.
*G06F 17/00* (2006.01)
*G09B 29/00* (2006.01)
*G01C 21/32* (2006.01)

(52) U.S. Cl.
CPC ........... *G09B 29/00* (2013.01); *G01C 21/32* (2013.01)

(58) Field of Classification Search
CPC .................. G09B 29/007; G01C 21/32
USPC .............. 701/202, 208, 209; 707/773
See application file for complete search history.

(56) References Cited

U.S. PATENT DOCUMENTS

| | | | | |
|---|---|---|---|---|
| 5,170,353 A | * | 12/1992 | Verstraete | 701/202 |
| 6,192,314 B1 | * | 2/2001 | Khavakh et al. | 701/209 |
| 7,079,946 B2 | * | 7/2006 | Hunzinger | 701/208 |

FOREIGN PATENT DOCUMENTS

| | | |
|---|---|---|
| JP | 4-72513 | 3/1992 |
| JP | 9-218047 | 8/1997 |
| JP | 2-201600 | 12/1999 |
| JP | 2005-78066 | 3/2005 |

* cited by examiner

*Primary Examiner* — Mariela Reyes
*Assistant Examiner* — Mohsen Almani
(74) *Attorney, Agent, or Firm* — Kenyon & Kenyon LLP

(57) ABSTRACT

A method for creating a directory of road sections of a digital road map for a navigation system is provided. Furthermore, a method for ascertaining all road sections within a search area is provided. Moreover, a computer program for performing a method for creating a directory of road sections and a method for ascertaining all road sections within a search area is provided.

10 Claims, 2 Drawing Sheets

METHOD FOR CREATING A DIRECTORY OF ROAD SECTIONS, METHOD FOR ASCERTAINING ALL ROAD SECTIONS WITHIN A SEARCH AREA, AND COMPUTER PROGRAM

FIELD OF INVENTION

The present invention relates to a method for creating a directory of road sections of a digital road map for a navigation system.

Furthermore, the present invention relates to a method for ascertaining all road sections within a search area.

Moreover, the present invention relates to a computer program for performing a method for creating a directory of road sections and a method for ascertaining all road sections within a search area.

BACKGROUND INFORMATION

Navigation systems for vehicles require a digital map of the road network for the main functions of position finding, destination selection, route calculation, and destination guiding. This digital road map is usually provided on a digital storage medium, such as a CD, DVD, or SD card. The data representing the digital road map are housed in files on the storage medium. The data are provided in a linear sequence in the file.

The navigation system requires these data to show the map of a road network on a display screen or to project the current position on a nearest road of the road network, for example. The current position may be determined, for example, using GPS (global positioning system) or Galileo and/or further inertial sensors, such as odometers, rotational speed sensors, or acceleration meters.

In many applications of the navigation system, large parts of the overall road network stored on the storage medium play no role or only a subordinate role. For example, a concrete destination route guide may be restricted to a regional area, although the road network of an entire country is stored. It is also conceivable that the user will want to have an enlarged detail of his current position displayed.

If all roads within a two-dimensional search area are searched in a linearly stored digital road map, the entire road map must be searched through, which is connected to significant time expenditure. In addition, the information content of digital road maps increases continuously; on the one hand, individual roads are broken down into shorter and shorter road sections, on the other hand, additional information is incorporated, such as geographic locations of fuel stations or so-called points of interest (POI). The time expenditure necessary for searching through the road map may result in a delayed display, which is annoying to a user.

To avoid completely searching through the road map in such cases, the roads contained in the digital road maps are structured.

Combining adjacent roads into an information unit, a so-called cluster, is known. City areas, city limits, district limits, or similar geographic boundaries are used for orientation. Adjacent clusters are combined into hierarchically higher clusters. This procedure is continued for higher levels. A relatively well-balanced, hierarchical tree arises as a result. For the tree not to become excessively large, roads are stored linearly and sorted geometrically on the lowermost level. Typical numbers on this level are approximately 1,000 roads.

In a further known structuring, the digitized road network has a uniform raster superimposed, which includes a plurality of equal rectangles, the so-called tiles. All roads which lie in a tile are stored together. An index is applied to the storage medium, which assigns geographic coordinates to the tiles, so that the tile may be rapidly accessed from a coordinate via the index. This has the disadvantage, however, that the tiles are populated with roads very differently; some tiles contain a very large number of roads, while others contain no or only a few roads, in contrast. The storage is thus ineffective and the time required for a search is very dependent on the location of the search area.

SUMMARY OF THE INVENTION

It is provided according to the present invention that the road sections are situated in an ordered N-tree, without the additional structure information in the related art being required. The method according to the present invention uses one road section of the road map as a starting point in each case for the division of the road map, i.e., as a "space divider" of the road map. The data required for localizing the road section, such as the geographic coordinates of the starting point and the end point and possibly further intermediate points, the so-called shape points, are already available in the map. Additional data for the division of the road map are not necessary. Therefore, on the one hand, the required storage space is reduced and, on the other hand, the search in the tree according to the present invention is relieved. Shorter access times may thus be implemented overall. At the same time, this allows additional information, such as the POI, to be taken into consideration in a predefined search time.

The method according to the present invention may be applied either to an entire road map or in combination with an already known method. When combined with known methods, the method according to the present invention is advantageously used at the lowermost level, where a plurality of roads, typically of the order of magnitude of 1,000 roads, is stored in linear files. The search on this level may be restricted from the search through the approximately 1,000 roads to the search of approximately 10 to 20 roads with the aid of the method according to the present invention, whereby a significant time savings is achieved. The tree according to the present invention is thus compatible with the data structures used heretofore.

The road sections are expediently assigned to the sublevels according to the sublevel in which they lie completely. If a road section may not clearly be assigned to one of the sublevels, it is assigned to the sublevel in which the road section which generates the partitioning lies.

In one embodiment, the method according to the present invention is characterized by M=3. The directory of the road sections is situated in a tri-tree in this case. The road maps partition each road section into three sublevels. The three sublevels may advantageously be situated as follows:

A straight line is initially defined through the starting point and the end point of a road section. Two straight lines parallel to this first straight line are then formed and situated in relation to one another so that the road section is enclosed completely, i.e., including possibly existing shape points, between these two parallel straight lines. It may be advisable in this case to situate the two parallel straight lines at a distance to one another only large enough that all points of the road section are just enclosed between them. The road section has a clearly defined orientation due to its starting point and its end point, for example, from the starting point to the end point. If the road section is viewed in the direction of its orientation, one of the three sublevels lies clearly to the left of the road section, a further sublevel lies entirely to the right of the road section, and the third sublevel includes the road section itself, i.e., it lies in the "middle."

A further embodiment of the method according to the present invention is characterized by N=5. The directory of the road sections is structured in this case as a so-called 5-tree. The five sublevels may advantageously be situated as follows:

Firstly, a rectangle is laid over the observed road section. For example, the starting point and the end point of the road section may form the end points of a diagonal of the rectangle and the rectangle may be selected to be large enough that all shape points lie within the rectangle. It may be advisable to select the rectangle in such a way that it is as small as possible. In a second step, the sides of the rectangle are supplemented to form half-lines, which each have the same mathematical direction, for example, clockwise or counterclockwise. The road map is clearly partitioned into five sublevels by the rectangle and the four half-lines. The sublevels may be identified by their location as "left," "middle" (rectangle), "right," "before," and "after" in relation to the orientation of the road section.

The search within the N-tree generated according to the invention may be performed especially rapidly if pointers to directly subsequent nodes are stored in each node. In this way, the addresses of the direct successors are immediately available in each node, so that a subtree of the node may be entered without a time delay.

In a typical linear list the search duration for a road section is proportional to the number of the road sections stored in the list. With an N-tree generated according to the present invention, in contrast, the search time only grows with log(N), if N is the number of the road sections stored in the N-tree or of the nodes of the N-tree. In particular in the event of a plurality of stored road sections, the advantage of the method according to the present invention is clearly shown.

The N-tree is expediently generated offline. A large amount of time may thus be invested in the balanced nature of the N-tree, whereby the search time online, i.e., in a navigation system, may be significantly shortened.

The method according to the present invention for ascertaining all road sections within a search area is preferably characterized by a rectangular search area. A rectangular search area only requires very little data to define it clearly. In addition, it is very simple to process, whereby the search time is reduced in relation to more complicated geometrical search areas.

A computer program having program code for performing the method described above is also presented as the present invention.

DETAILED DESCRIPTION

Figure 1:
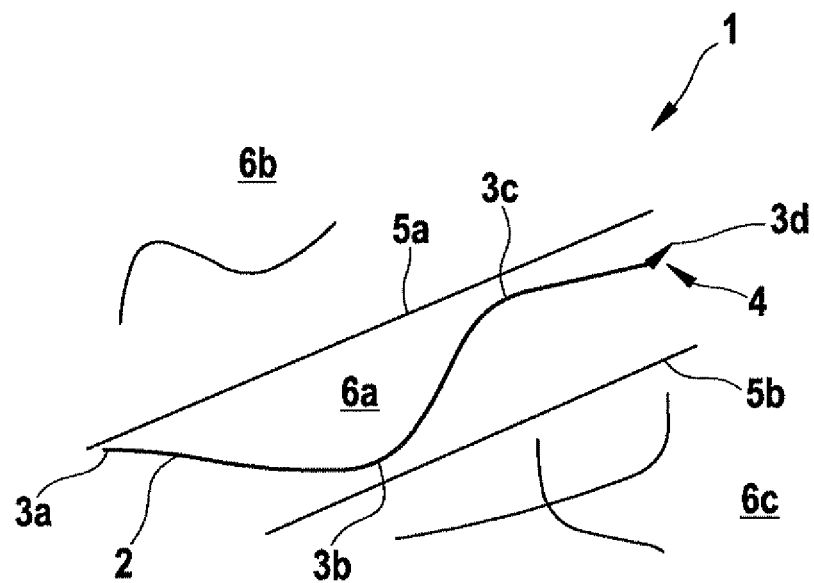
FIG. 1 shows a detail of a first digital road map.

A detail of a first digital road map 1 is shown in FIG. 1.
Digital road map 1 contains a road section 2. Road section 2 has a starting point 3a, and, in its further course, two shape points 3b, 3c, and an end point 3d. Both shape points 3b, 3c show a course of road section 2 deviating from a linear course, i.e., a curve. The geographical coordinates, such as the geographic length and the geographic width, for road section 2 are stored in digital road map 1. Further information may be stored, such as the height above sea level or data about fuel stations or POI, which lie on road section 2.

An orientation is assigned to road section 2. The orientation is indicated by arrow 4, which is directed from starting point 3a to end point 3d.

Two further straight lines 5a, 5b, which are parallel to one another, are shown in FIG. 1. Both straight lines 5a, 5b enclose a middle sublevel 6a between them. Road section 2 runs completely in middle sublevel 6a.

Viewed from road section 2, a left sublevel 6b lies to the left adjacent to road section 2, i.e., middle sublevel 6a in the direction of the orientation. A right sublevel 6c lies to the right of road section 2, i.e., middle sublevel 6a.

This configuration of sublevels 6a, 6b, 6c oriented to the orientation of road section 2 is clearly defined.

Three sublevels 6a, 6b, 6c form a clear breakdown and thus a partitioning of digital road map 1.

The partitioning of digital road map 1 into three sublevels 6a, 6b, 6c by road section 2 shown in FIG. 1 forms the basis for the inclusion of further road sections and the construction of a tri-tree.

Figure 2:
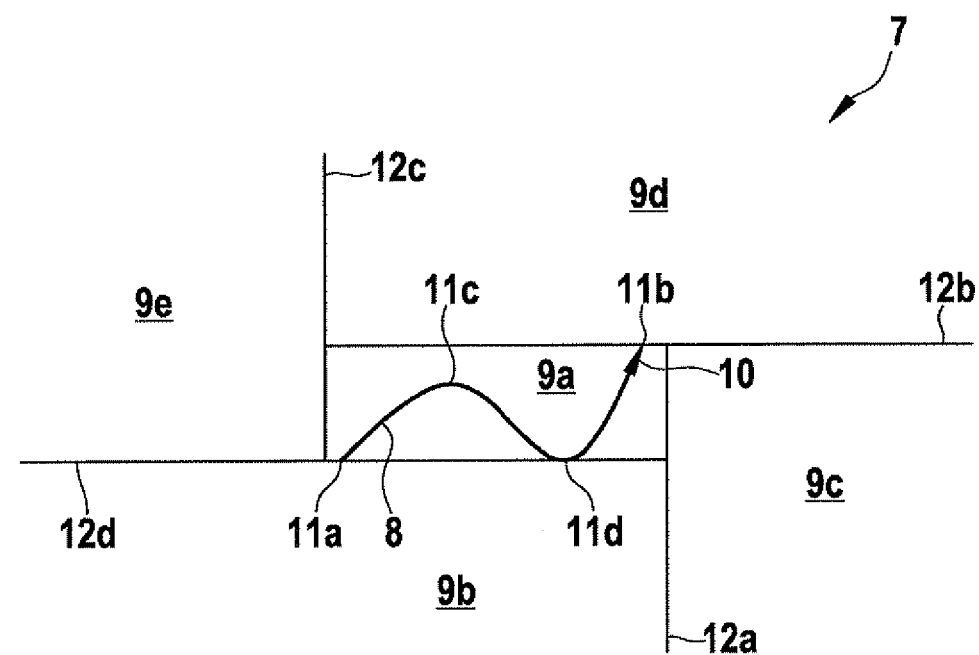
FIG. 2 shows a detail of a second digital road map.

The breakdown of a second digital road map 7 by a road section 8 into 5 sublevels 9a, 9b, 9c, 9d, 9e is shown in FIG. 2. The orientation of road section 8 is shown by an arrow 10.

Road section 8 has a starting point 11a, an end point 11b, and two shape points 11c, 11d. The entire road section having starting, end, and shape points 11a, 11b, 11c, 11d lies inside a rectangle which represents one of sublevels 9a, 9b, 9c, 9d, 9e. The sides of the rectangle have been supplemented to form four half-lines 12a, 12b, 12c, 12d. The supplementation of the sides of the rectangle to form half-lines 12a, 12b, 12c, 12d has been performed clockwise.

Digital road map 7 is broken down into 5 sublevels 9a, 9b, 9c, 9d, 9e by the rectangle and by half-lines 12a, 12b, 12c, 12d. Sublevels 9a, 9b, 9c, 9d, 9e may be situated in "middle" sublevel 9a, "right" sublevel 9b, "left" sublevel 9d, sublevel 9c "in front," and sublevel 9e "behind" as a function of the orientation of road section 8.

Figure 3:
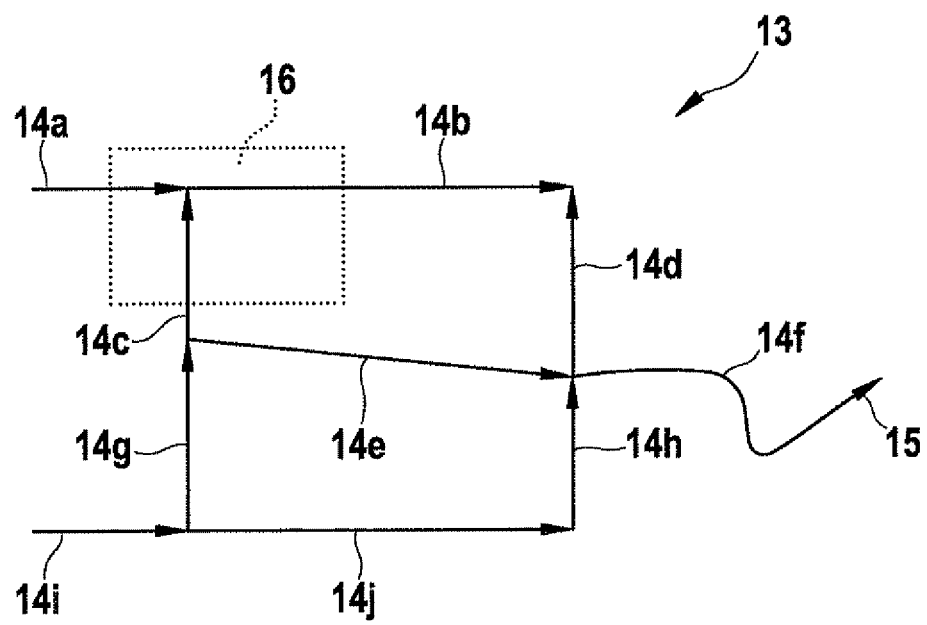
FIG. 3 shows a detail of a third digital road map.

A detail of a third digital road map 13 is shown in FIG. 3.

Digital road map 13 includes 10 road sections 14a through j, whose orientation is indicated in each case by arrow 15. For the sake of clarity, arrow 15 is only shown for road section 14f.

Furthermore, a search area 16 is shown in FIG. 3. Search area 16 at least partially includes road sections 14a, 14b, 14c.

It is first explained hereafter how a directory of road sections 14a through j is created using the method according to the present invention.

Figure 4:
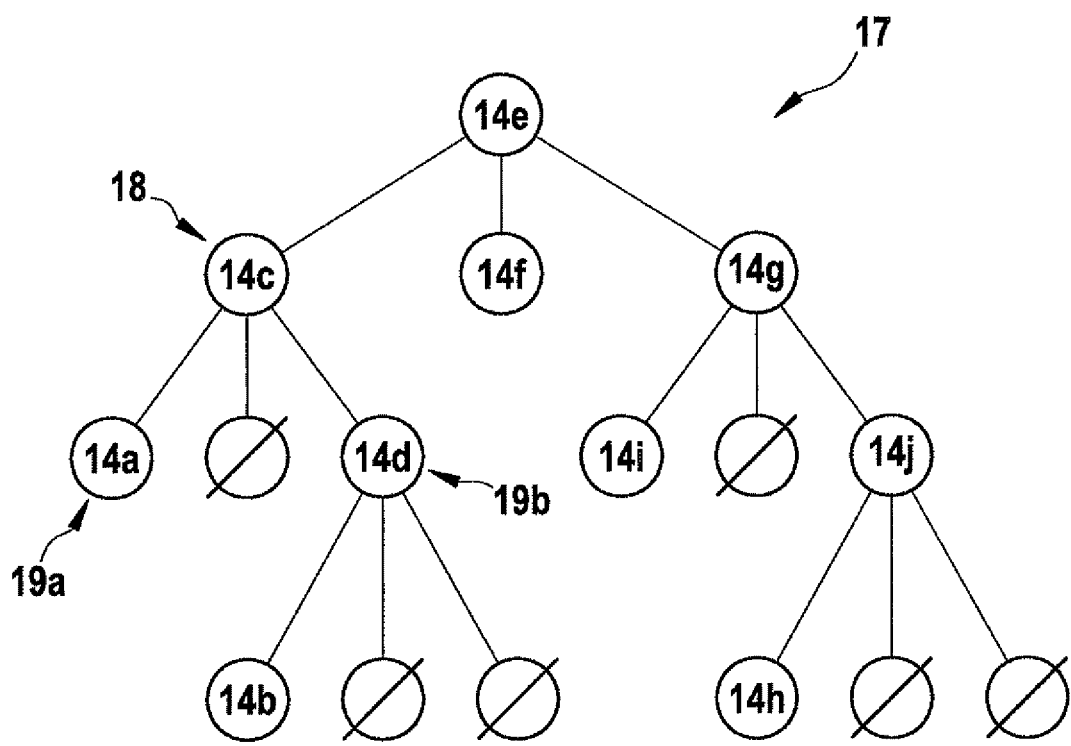
FIG. 4 shows a 3-tree (tri-tree) for the detail shown in FIG. 3.

The directory will receive the structure of a tri-tree 17, as shown in FIG. 4.

The following search tree condition is defined for tri-tree 17 in the example of road section 14e: road map 13 is partitioned into three sublevels by road section 14e of the eponymous node. The sublevels are situated in relation to one another as a function of the orientation of road section 14e. All remaining road sections 14a through d may be assigned to precisely one of the sublevels and thus to one subtree of the node. Road sections 14a through d remain in the left sublevel, road section 14f remains in the middle sublevel, and road sections 14g through j remain in the right sublevel.

In the next step, the left sublevel is divided further. For this purpose, one of road sections 14a through d, which lies in this sublevel, is selected. In this example, it is road section 14c.

Road section 14c again divides the left sublevel into three sublevels, one of which lies to the left in relation to the orientation of road 14c, another lies in the middle, and the third on the right.

Road sections 14a, b, d, which have not yet been selected, are now assigned to these sublevels. Road section 14a lies in the left sublevel of road section 14c, the middle sublevel is empty, and road sections 14b, c lie in the right sublevel.

Next, road section 14d is selected as the next node. Only road section 14b now remains. This lies in the left sublevel in relation to road section 14d. No road sections are present in the middle and right sublevels. All road sections 14a through d are thus incorporated in the left subtree in relation to road section 14e, the root of the tri-tree.

The nodes are set correspondingly for the middle and right subtree. Tri-tree 17 from FIG. 4 thus results.

The method according to the present invention for ascertaining all road sections within a search area is explained below in the example of road map 13, tri-tree 17, and search area 16.

The inclusion into tri-tree 17 for the search always occurs via the root, in this case road section 14e.

In relation to road section 14e, search area 16 lies completely in the left sublevel. Because search area 16 has no overlap with the middle sublevel, road section 14e does not come into consideration as a possible search result (method step f)).

Only the left sublevel is determined in the following example in method step g).

After step h), a subtree 18 is to be determined, which is assigned to the left sublevel. Subtree 18 includes road sections 14a through d.

Subtree 18 is flagged after method step 1).

After method step j), method steps b) to i) are to be repeated, the selection being restricted to the subtrees flagged in step i), until all flagged subtrees have been selected precisely once.

Only subtree 18 has been flagged in the present example, so that only it may be selected. The root node of this subtree 18 is the node having road section 14c. For road section 14c, search area 16 lies in the left, right, and middle sublevels. After method step f), road section 14c comes into consideration and is flagged as a possible search result.

Subtrees 19a, b are now to be determined, which are appended to the nodes of road section 14c. One subtree 19a only includes the node having road section 14a. Second subtree 19b includes the node for road section 14d as the root node of this subtree 19b and road section 14b.

In regard to road section 14a, search area 16 lies in the left, right, and also middle sublevels. Because the node for road section 14a represents a leaf of tri-tree 17, no further subtrees have to be flagged. Only road section 14a is to be flagged as a possible search result.

The study of the subtree having road section 14d as the root has the result that search area 16 lies completely in the left sublevel. Road section 14b is thus obtained. Search area 16 lies in the middle sublevel in regard to road section 14b, which corresponds to a leaf of tri-tree 17. Road section 14b thus also comes into consideration as a search result and is flagged.

All subtrees 18, 19a, and b which have been flagged once in the meantime have now been processed.

In the last method step, of the flagged possible search results, road sections 14a, b, c, those with which search area 16 actually has no overlap are discarded. In the present case, no road section 14a, b, c is to be discarded. The search thus leads to the search result; road sections 14a, b, c.

The invention claimed is:

1. A method for creating a directory of road sections of a digital road map portion for a navigation system, wherein the directory receives a data structure of an ordered N-tree, in which the road sections are stored in nodes, the method comprising:
   a) assigning a geographic location to each of the road sections;
   b) assigning an orientation to each of the road sections;
   c) defining a search tree condition for the road map portion, wherein:
      (i) the road map portion is partitioned into N sublevels by a root road section, precisely one of which sublevels contains the root road section;
      (ii) the sublevels of the road map portion are situated in relation to one another as a function of respective orientations of the sublevels relative to the root road section; and
      (iii) all road sections are assigned to precisely one of the sublevels of the road map portion and thus precisely one subtree of the node;
   d) selecting one of the road sections;
   e) searching for the selected road section in the tree, wherein the search ends at a terminal node having at most N−1 subtrees, none of which contains the selected road section;
   f) appending the selected road section as a leaf to the terminal node according to the search tree condition;
   g) repeating steps d) through f) until each road section has been selected precisely once; and
   h) storing the directory on a data carrier.

2. The method according to claim 1, wherein the road sections from substep c)(iii) are assigned to the sublevel of the road map portion in which the road sections lie completely, otherwise to the sublevel in which the road section from substep c)(i) lies.

3. The method according to claim 1, wherein N=3.

4. The method according to claim 3, wherein the three sublevels are formed by:
   a) defining a first straight line through a starting point and an end point of the root road section;
   b) forming two additional straight lines parallel to the first straight line and to one another, thereby enclosing the root road section completely between the two additional straight lines; and
   c) situating the three sublevels as a function of the orientation of the three sublevels relative to the root road section, as "left", "middle", and "right".

5. The method according to claim 1, wherein N=5.

6. The method as recited in claim 5, wherein the five sublevels are formed by:
   a) forming a rectangle which contains the root road section;
   b) forming half-lines as extensions of sides of the rectangle; and
   c) situating the five sublevels as a function of the orientation of the five sublevels relative to the root road section, as "left", "middle", "right", "before", and "after".

7. The method according to claim 1, wherein pointers are stored in each node, each pointer pointing to subsequent nodes.

8. The method according claim 1, wherein step (c) further comprises:
   (iv) for each sublevel, iteratively repeating substeps (i) through (iii).

9. A non-transitory computer-readable data storage medium containing a computer program having program code which, when executed by a computer, performs a method for creating a directory of road sections of a digital road map portion for a navigation system, wherein the directory receives a data structure of an ordered N-tree, in which the road sections are stored in nodes, the method comprising:
- a) assigning a geographic location to each of the road sections;
- b) assigning an orientation to each of the road sections;
- c) defining a search tree condition for the road map portion, wherein:
    - (i) the road map portion is partitioned into N sublevels by a root road section, precisely one of which sublevels contains the root road section;
    - (ii) the sublevels of the road map portion are situated in relation to one another as a function of respective orientations of the sublevels relative to the root road section; and
    - (iii) all road sections are assigned to precisely one of the sublevels of the road map portion and thus precisely one subtree of the node;
- d) selecting one of the road sections;
- e) searching for the selected road section in the tree, wherein the search ends at a terminal node having at most N−1 subtrees, none of which contains the selected road section;
- f) appending the selected road section as a leaf to the terminal node according to the search tree condition;
- g) repeating steps d) through f) until each road section has been selected precisely once; and
- h) storing the directory on a data carrier.

10. The non-transitory computer-readable data storage medium according to claim 9, wherein step (c) of the method further comprises:
- (iv) for each sublevel, iteratively repeating substeps (i) through (iii).

\* \* \* \* \*